Patented Oct. 23, 1928.

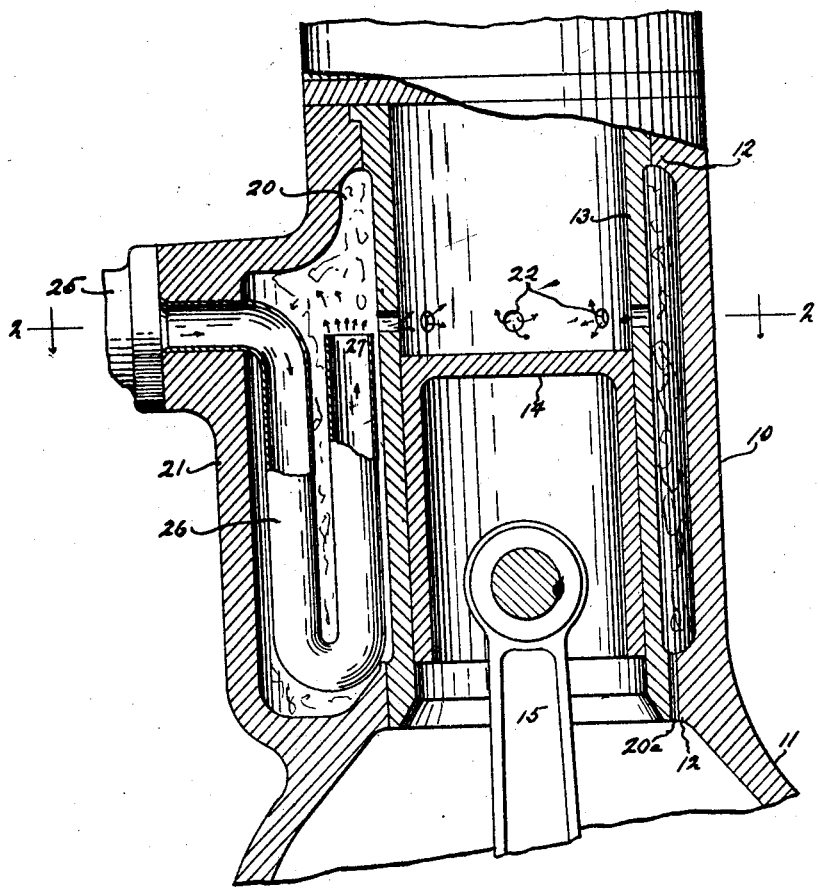
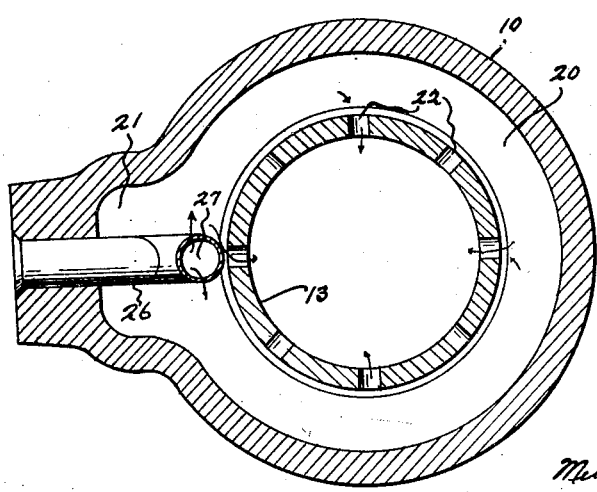

1,688,903

UNITED STATES PATENT OFFICE.

MELBOURNE E. THOMPSON, OF DETROIT, MICHIGAN, ASSIGNOR TO TRIPPENSEE SALES AND MANUFACTURING COMPANY, OF DETROIT, MICHIGAN, A CORPORATION OF MICHIGAN.

COMPRESSOR FOR REFRIGERATING APPARATUS.

Application filed June 16, 1927. Serial No. 199,273.

The present invention relates to refrigeration apparatus and more especially to compressors for use in refrigerating apparatus of the household type though not limited to that type.

In apparatus of the type indicated lowering of atmospheric temperatures frequently causes conditions under which the compressor is caused to pound or knock noisily and therefore become objectionable. This is due to the fact that some of the refrigerant becomes liquefied before passing through the compressor and therefore causes undue valve action. Some of such liquid may also collect on top of the piston and strike the cylinder head.

The principal object of the present invention therefore is to relieve this objection by preventing the entrance of such liquefied refrigerant into the compressor.

Other objects of the invention will readily occur to those skilled in the art upon reference to the following description and accompanying drawing in which:—

Fig. 1 is a vertical section through a compressor embodying the preferred form of the invention;

Fig. 2 is a horizontal section therethrough on line 2—2 of Fig. 1.

In the drawings, the cylinder 10 of a compressor is shown as formed upon a crank case 11, and as being provided with internal flanges 12 serving to locate and hold a liner 13, in which operates a piston 14. The latter is fitted with the usual connecting rod 15 actuated by a crank shaft (not shown).

The space between the liner 13 and cylinder 10 extends around the liner and forms an intake chamber 20 connected to the crank case through one or more pressure equalizing vents 20ª. This chamber is preferably provided with an enlargement 21 on one side, for a purpose to be described, and passage of gas into the cylinder liner is preferably through openings 22 in the latter a little above the lower limit of the piston travel.

As is well known, compression of gases results in the generation of heat and advantage is taken of this fact to overcome the objection above stated. In the enlargement 21 and connected with the lead in pipe 25 is a short U-shaped, preferably copper, tube 26 dipping down to near the bottom of the enlargement 21 and being open at its inner end 27. This tube forms a chamber to collect the liquefied portions of the refrigerant, preventing them from collecting in the bottom of the intake chamber. Further, being bent as it is it baffles to some extent the incoming gases and tends to separate out the fine drops. The small body of liquid collecting in the tube 26 absorbs heat from the compressor and vaporizes before passing into the compressor proper.

Now having described the invention and the preferred form of embodiment thereof, it is to be understood that said invention is to be limited, not to the specific details herein set forth but, only by the scope of the claims which follow.

I claim:—

1. In a refrigerating compressor a cylinder, an intake chamber for refrigerant in the form of a jacket around said cylinder, a refrigerant inlet for said chamber, an outlet for refrigerant from said chamber to said cylinder, and a liquid collector and vaporizer connected to said inlet and located within said chamber.

2. In a refrigerating compressor a cylinder, an intake chamber for refrigerant in the form of a jacket around said cylinder, a refrigerant inlet for said chamber, an outlet for refrigerant from said chamber to said cylinder, and a liquid collector and vaporizer connected to said inlet and located within said chamber, said collector consisting of a U-shaped tube through which incoming refrigerant passes and in which liquid refrigerant may absorb heat from the compressor.

MELBOURNE E. THOMPSON.